(12) United States Patent  (10) Patent No.: US 8,275,547 B2
Rousselle et al. (45) Date of Patent: Sep. 25, 2012

(54) METHOD AND SYSTEM FOR LOCATING A STEM OF A TARGET TREE

(75) Inventors: Adam Robert Rousselle, New Hope, PA (US); Vesa Johannes Leppanen, Stowe, VT (US); Jari Tapio Kinnunen, Kulho (FI); Alan John DeJong, Hyde Park, VT (US); Hugh Andrew Clymer, Stowe, VT (US); Leighton Edward Dalmasse, Montpelier, VT (US)

(73) Assignee: Utility Risk Management Corporation, LLC, Stowe, VT (US)

( * ) Notice: Subject to any disclaimer, the term of this patent is extended or adjusted under 35 U.S.C. 154(b) by 601 days.

(21) Appl. No.: 12/570,779

(22) Filed: Sep. 30, 2009

(65) Prior Publication Data

US 2010/0205219 A1 Aug. 12, 2010

(51) Int. Cl.
*G01V 3/00* (2006.01)
*G01B 21/00* (2006.01)
(52) U.S. Cl. .............................. 702/2; 33/228
(58) Field of Classification Search .................. 33/1 A, 33/227, 228, 521; 702/2, 5, 150
See application file for complete search history.

(56) References Cited

U.S. PATENT DOCUMENTS

| | | |
|---|---|---|
| 5,574,841 A | 11/1996 | Thompson et al. |
| 5,633,802 A | 5/1997 | Thompson et al. |
| 5,652,717 A | 7/1997 | Miller et al. |
| 6,012,835 A | 1/2000 | Thompson et al. |
| 6,338,027 B1 | 1/2002 | Fulton |
| 6,563,122 B1 | 5/2003 | Ludeker et al. |
| 6,751,553 B2 | 6/2004 | Young et al. |
| 6,792,684 B1 | 9/2004 | Hyyppa |
| 6,975,942 B2 | 12/2005 | Young et al. |
| 7,013,235 B2 | 3/2006 | Hyyppa et al. |
| 7,046,841 B1 | 5/2006 | Dow et al. |
| 7,180,517 B2 | 2/2007 | Haynes |
| 7,187,452 B2 | 3/2007 | Jupp et al. |
| 7,191,066 B1 | 3/2007 | Rahmes et al. |

(Continued)

FOREIGN PATENT DOCUMENTS

WO WO2005088252 A1 9/2005

(Continued)

OTHER PUBLICATIONS

Solbert et al., "Single Tree Segmentation Using Airborne Laser Scanner Data in a Structurally Heterogeneous Spruce Forest" (Photogrammetric Engineering & Remote Sensing, Dec. 2006).

(Continued)

*Primary Examiner* — G. Bradley Bennett
(74) *Attorney, Agent, or Firm* — Pepper Hamilton LLP

(57) ABSTRACT

A method for locating a stem of a target tree is disclosed. The target tree is identified from a sensing dataset. At least one slice is created from the sensing dataset. The at least one slice includes at least a portion of the target tree. A tree stem location of the target tree is determined from the at least one slice. A system for locating a stem of a target tree is also disclosed. The system has a processor configured to implement the described method. The system also has a data input coupled to the processor and configured to provide the processor with the sensing dataset. The system further has a user interface coupled to either the processor or the data input.

50 Claims, 12 Drawing Sheets

U.S. PATENT DOCUMENTS

| | | | |
|---|---|---|---|
| 7,212,670 | B1 | 5/2007 | Rousselle et al. |
| 7,216,003 | B2 | 5/2007 | Faulkner et al. |
| 7,248,342 | B1 | 7/2007 | Degnan |
| 7,324,104 | B1 | 1/2008 | Bitter et al. |
| 7,400,976 | B2 | 7/2008 | Young et al. |
| 7,474,964 | B1 | 1/2009 | Welty et al. |
| 7,539,605 | B2 | 5/2009 | Rahmes et al. |
| 7,574,024 | B2 | 8/2009 | Bitter et al. |
| 7,583,275 | B2 | 9/2009 | Neumann et al. |
| 2004/0130702 | A1 | 7/2004 | Jupp et al. |
| 2004/0236535 | A1 | 11/2004 | Hyyppa et al. |
| 2005/0087110 | A1 | 4/2005 | Kobayashi et al. |
| 2005/0216237 | A1 | 9/2005 | Adachi et al. |
| 2005/0279069 | A1 | 12/2005 | Novembri et al. |
| 2005/0288872 | A1 | 12/2005 | Old et al. |
| 2007/0067106 | A1* | 3/2007 | Antoine .......................... 702/5 |
| 2007/0265781 | A1 | 11/2007 | Nemethy et al. |
| 2007/0291994 | A1 | 12/2007 | Kelle et al. |
| 2008/0062167 | A1 | 3/2008 | Boggs et al. |
| 2008/0133195 | A1 | 6/2008 | Rahmes et al. |
| 2008/0260237 | A1 | 10/2008 | Savolainen et al. |
| 2008/0319668 | A1 | 12/2008 | Welty et al. |
| 2008/0319673 | A1 | 12/2008 | Welty et al. |
| 2009/0103773 | A1 | 4/2009 | Wheeler et al. |
| 2009/0210205 | A1 | 8/2009 | Sullivan et al. |
| 2012/0004847 | A1* | 1/2012 | Welty .............................. 702/2 |
| 2012/0169498 | A1* | 7/2012 | Leppanen et al. ................ 702/2 |

FOREIGN PATENT DOCUMENTS

| | | | |
|---|---|---|---|
| WO | WO2007117654 | A2 | 10/2007 |
| WO | WO2007149250 | A2 | 12/2007 |
| WO | WO2009025928 | A2 | 2/2009 |
| WO | WO2009086158 | A2 | 7/2009 |

OTHER PUBLICATIONS

Moskal., L. M. and G. Zheng, 2008. *Forest inventory and stem characterization from terrestrial LiDAR*. Factsheet #1. Remote Sensing and Geospatial Application Laboratory, University of Washington, Seattle, WA.

Bryan Hooper, "Vegetation Management Takes to the Air", (Transmission & Distribution World, Sep. 1, 2003) (http://www.tdworld.com/mag/power_vegetation_management_takes/index.html).

Bryan Hooper, "Vegetation Management Takes to the Air—BC Hydro pilots the use of LIDAR and PLS-CADD to identify vegetation encroaching on transmission lines.", (Transmission & Distribution World, Sep. 2003).

Persson et al., "Detecting and Measuring Individual Trees Using an Airborne Laser Scanner", (Photogrammetric Engineering & Remote Sensing, Sep. 2002, pp. 925-932).

Brandtberg et al., "Detection and analysis of individual leaf-off tree crowns in small footprint, high sampling density lidar data from the eastern deciduous forest in North America", (Remote Senseing of Environment, 2003, pp. 290-303, vol. 85).

"PLS-CADD (Power Line Systems—Computer Aided Design and Drafting", (Power Line Systems Inc., 2009).

"Transmission Corridor Observation and Reporting (TCOR)", (GeoDigital, 2009).

"Network Mapping Projects", (Network Mapping, LLC).

Lee et al., "A LiDAR-derived canopy density model for tree stem and crown mapping in Australian forests", (Remote Sensing of Environment, Dec. 28, 2007, pp. 493-518, vol. 111, Issue 4).

Siegfried Guggenmoos, "Effects of Tree Mortality on Power Line Security", (Journal of Arboriculture, Jul. 2003, vol. 29(4).

Morsdorf et al., "LIDAR-based geometric reconstruction for boreal type forest stands at single tree level for forest and wildland fire management", (Remote Sensing of Environment, Aug. 2004, pp. 353-362, vol. 92, Issue 3).

"Clearance along the right of way is essential for system safety and reliability, and the right tools can help you achieve better results from your vegetation management program", (Davey Resource Group).

"Transmission Vegetation Management Software", (Clearion Software, 2009).

"Clearion Vegetation Management for Electric Distribution", (Clearion Software, 2009).

"Vegetation LiDAR", (GeoDigital, 2009).

Holmgren et al., "Identifying species of individual trees using airborne laser scanner", (Remote Sensing of Environment, 2004, pp. 415-423, vol. 90).

* cited by examiner ing on its own or for trees surrounded on all sides by a number of other trees in a forest, it often leads to incorrect stem origin location for trees growing on the edge of an opening in the canopy, for example a right of way (ROW), such as a power line corridor or railroad corridor.

METHOD AND SYSTEM FOR LOCATING A STEM OF A TARGET TREE

FIELD

The claimed invention generally relates to methods and systems for determining information about trees from sensing data, such as LiDAR data. More specifically, the claimed invention relates to a method and system for locating a stem of a target tree.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

For many utilities, trees are the number-one cause of all unplanned distribution outages. Most damage to electric utility systems during storms is caused by a falling tree or branch that takes power lines out of service. In order to help reduce the frequency of tree damage to utility systems, many utilities implement vegetation management programs as a preventative measure. North American utilities spend $7 billion to $10 billion annually on vegetation management in an effort to prevent service interruptions and safety hazards associated with trees contacting conductors.

Traditionally, vegetation management programs have relied on regular surveying and pruning by arborist teams to help control vegetation around utility systems, but the sheer number of utility lines covering vast distances makes it impractical, in many cases, to send survey teams on the ground. As a result, many utility companies have turned in the past to aerial reconnaissance techniques to provide photographic imagery of their utility systems which can be examined for possible vegetation growth issues. The material has included both nadir-looking or oblique imaging techniques, with still images and video. Unfortunately, such aerial image material does not provide the dimensional data necessary to judge whether or not a tree nearby a utility system is a risk for interfering with the utility if the tree were to fall over. From such data, determining accurate reach of the trees, and their ability to violate the safety zones of the conductors if they fall, is very limited. More recently, vegetation managers have turned to aerial reconnaissance systems which can provide three-dimensional data, such as LiDAR (light detection and ranging) systems to learn more about the vegetation adjacent to their power systems. For example, U.S. Pat. Nos. 6,792,684 and 7,474,964 disclose methods which analyze an overhead perspective of aerial LiDAR data to determine tree heights, a tree crown size, an assumed location for a tree based on the highest point in the tree crown, and a stem or trunk diameter. The tree height and crown-size information can be compared to known configurations in order to predict a tree's species, age, and development class. Techniques, such as those disclosed in U.S. Pat. No. 7,212,670, are even known to estimate stem size (trunk size) from a comparison of tree height with publicly obtainable forestry data. Unfortunately, none of the known LiDAR methods enable the determination of an accurate location for a tree's stem origin (also known as a seed point, stump point, or trunk location, where the tree grows out of the ground). As mentioned for the above patents, as well as in U.S. Pat. No. 7,539,605, trunk locations are currently estimated to be directly under the highest point in the tree crown. While this assumption may be generally valid for a tree growing on its own or for trees surrounded on all sides by a number of other trees in a forest, it often leads to incorrect stem origin location for trees growing on the edge of an opening in the canopy, for example a right of way (ROW), such as a power line corridor or railroad corridor.

Along ROW's the vegetation often has a tendency to grow towards the opening due to better availability of sunlight. This moves the crown centers, during the course of growth, outside the horizontal location of the tree stem origin, causing the trees and vegetation to "lean" towards the openings.

When existing remote sensing and other crown-recognizing methodologies are applied to locate the vegetation, crowns (typically, perimeters, centroid or tops) are often the targets sensed and located, lacking precise information about actual ownership—as defined by the stem origin position. The lack of precise location information can cause management challenges, since ownership, naturally, defines the right to decide on cutting, felling, thinning, side-trimming, or delimbing trees.

Often, tree crowns grow beyond ownership or management right boundaries. Especially often, this happens on right-of-ways (ROWs), which are legal entities, giving the management rights of the area inside ROW to the ROW-holders. ROWs are necessary for managing, for example, utility lines, distribution power lines, gas pipes, communication lines, roads, railroads, etc.

Aside from the need to understand the actual location of a tree crown versus the ROW boundaries, it is also important to know the actual stem origin in order to predict the proper path a tree could follow if knocked-over, broken, or cut down. The stem origin of the tree is often used as a pivot point in falling tree analysis, but the prior art's assumption that the stem origin is located beneath the highest point of a tree's crown can often lead to inaccurate results. The falling path of the tree may be defined as the set of points the tree may touch if it falls towards a certain direction. Falling path analysis is used, for example, to determine whether a tree, if it falls, may hit a power line conductor. The geometric analysis of falling vegetation is dependent on the geometry between the top of the vegetation, the location of the construction analyzed and the location of the bearing point used to rotate the falling tree around. Unfortunately, falling tree analysis is currently done using a horizontal projection of the point analyzed (such as the highest crown point) to the ground level as a bearing point. Resultant inaccurate bearing point locations result in improper falling vegetation analysis.

Therefore, it would be very desirable to have an economical, reliable, and easy to use method and system for locating a stem of a target tree.

SUMMARY

A method for locating a stem of a target tree is disclosed. The target tree is identified from a sensing dataset. At least one slice is created from the sensing dataset, the at least one slice including at least a portion of the target tree. A tree stem location of the target tree is determined from the at least one slice.

A computer readable storage medium is disclosed. The computer readable storage medium has stored thereon instructions for locating a stem of a target tree. The instructions, when executed by a processor, cause the processor to provide a sensing dataset. The instructions also cause the processor to identify the target tree from the sensing dataset.

The instructions further cause the processor to create at least one slice from the sensing dataset, the at least one slice including at least a portion of the target tree. The instructions also cause the processor to determine a tree stem location of the target tree from the at least one slice.

A graphical user interface (GUI) for use on an electronic device is also disclosed. The GUI is for locating a stem of a target tree. The GUI has a dataset selection control configured to provide a sensing dataset. The GUI also has a target selection control configured to identify the target tree from the sensing dataset. The GUI further has a slice control configured to create at least one slice from the sensing dataset, the at least one slice including at least a portion of the target tree. The GUI also has a stem location display configured to display a tree stem location of the target tree which is determined from the at least one slice.

A system for locating a stem of a target tree is also disclosed. The system has a processor configured to 1) identify the target tree from a sensing dataset; 2) create at least one slice from the sensing dataset, the at least one slice including at least a portion of the target tree; and 3) determine a tree stem location of the target tree from the at least one slice. The system also has a data input coupled to the processor and configured to provide the processor with the sensing dataset. The system further has a user interface coupled to either the processor or the data input.

Another method for locating a stem of a target tree is disclosed. The target tree is identified from an aerially gathered three-dimensional sensing dataset selected from the group consisting of LiDAR data (sometimes called "laser scanning data"), radar data, synthetic aperture radar data, or data from any sensor based on scanning distance-measurement and providing 3D point clouds. The target tree is identified by identifying at least one of a crown or a highest point of a crown of the target tree from the sensing dataset. At least one substantially vertical slice is created from the sensing dataset, the at least one slice including: 1) at least a portion of the target tree; and 2) a terrain. A tree stem location of the target tree is determined from the at least one slice by fitting a stem location curve from the included portion of the target tree to the terrain based on tree data in the at least one slice. A stem origin is defined where the stem location curve intersects the terrain. At least one of the stem location curve or the stem origin is displayed along with a representation of the at least one slice. A prediction is made whether at least one tree point of interest on the target tree is liable to intersect with a safety buffer zone by rotating the at least one tree point of interest around a bearing point related to the stem location curve. The at least one tree point of interest is selected from a group consisting of a part of the stem location curve, an end of the stem location curve opposite the terrain, the included portion of the target tree, and a user-selected point in the at least one slice. The bearing point related to the stem location curve is selected from the group consisting of the stem origin, a root offset from the stem origin, a distance along the stem location curve from the stem origin, a position on the stem location curve at a designated height from the terrain. All or a subset of tree points are linked to the bearing point. Falling tree analysis can be performed now using the linear geometry or point set of the target line, any selected tree point and the bearing point. If it is predicted that the at least one tree point of interest on the target tree is liable to intersect with the safety buffer zone, then an action is taken from the group consisting of: 1) alerting a user to a possible intersection with the safety buffer zone; 2) displaying one or more possible points of intersection with the safety buffer zone; 3) flagging the target tree on a map or a GPS point of interest-file as needing service due to possible intersection with the safety buffer zone; and 4) generating a work order to have the target tree mitigated.

Figure 1:
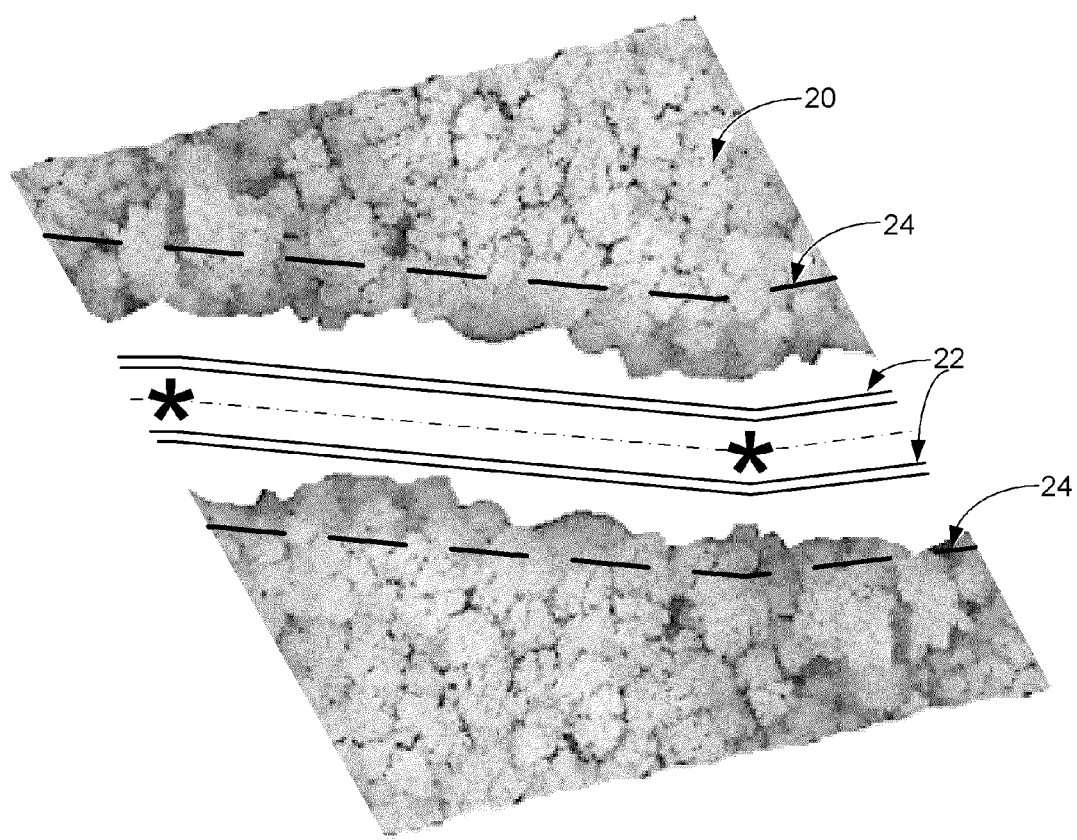
FIG. 1 schematically illustrates an embodiment of a sensing dataset with known power line locations and right-of-way (ROW) boundary lines for use in a method and system for locating a stem of a target tree.
Figure 1:
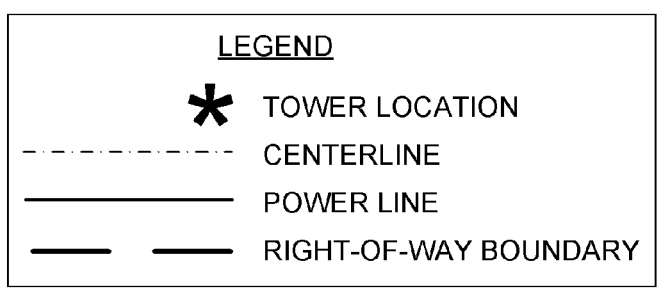

It will be appreciated that for purposes of clarity and where deemed appropriate, reference numerals have been repeated in the figures to indicate corresponding features, and that the various elements in the drawings have not necessarily been drawn to scale in order to better show the features.

DETAILED DESCRIPTION

FIG. 1 schematically illustrates an embodiment of a sensing dataset 20 with known power line conductor locations 22 and right-of-way (ROW) boundary lines 24 for use in a method and system for locating a stem of a target tree. The sensing dataset 20 is preferably a three-dimensional dataset gathered aerially from above the trees, however some embodiments may utilize ground-based sensing dataset gathering techniques. In this figure, a classified 3D point cloud dataset from LiDAR sensor has been modified to a rater map, showing vegetation height as grayscale value of the pixels. The brighter grayscale value represents higher vegetation, black values presenting no vegetation. For ease of illustration in this black-and-white line drawing, the cleared area between the ROW boundary lines 24 which is not covered by the gray-scale trees is shown as white, although typically such area in a LiDAR dataset would be shown as black. Here, the cleared ROW area is shown in white so that other structures may be illustrated. Still other embodiments may use a combination of aerial and ground-based sensing data gathering techniques. The sensing dataset 20 may include a variety of data types, such as, but not limited to light detection and ranging (LiDAR) data, (sometimes called "laser scanning data"), radar data, synthetic aperture radar data, data from any sensor based on scanning distance-measurement and providing 3D point clouds, digital imagery, or hyperspectral imaging data. The sensing dataset 20 may be supported by other datasets like digital imagery, video or hyperspectral imaging data. For convenience, the sensing dataset 20 will often be referred to as LiDAR data, however it should be understood that other forms of data may be suitable for use as sensing data within the scope of the claimed invention. The sensing dataset 20 may also include positioning data, for example global positioning system (GPS) data so coordinate locations of objects within the sensing dataset are known. Additionally, the sensing dataset 20 may be combined with known utility system locations. In the embodiment of FIG. 1, known power line conductor locations 22 and ROW boundaries 24 have been combined with the sensing dataset so that a reference to the power line locations 22 and ROW boundaries 24 may be made.

Figure 2:
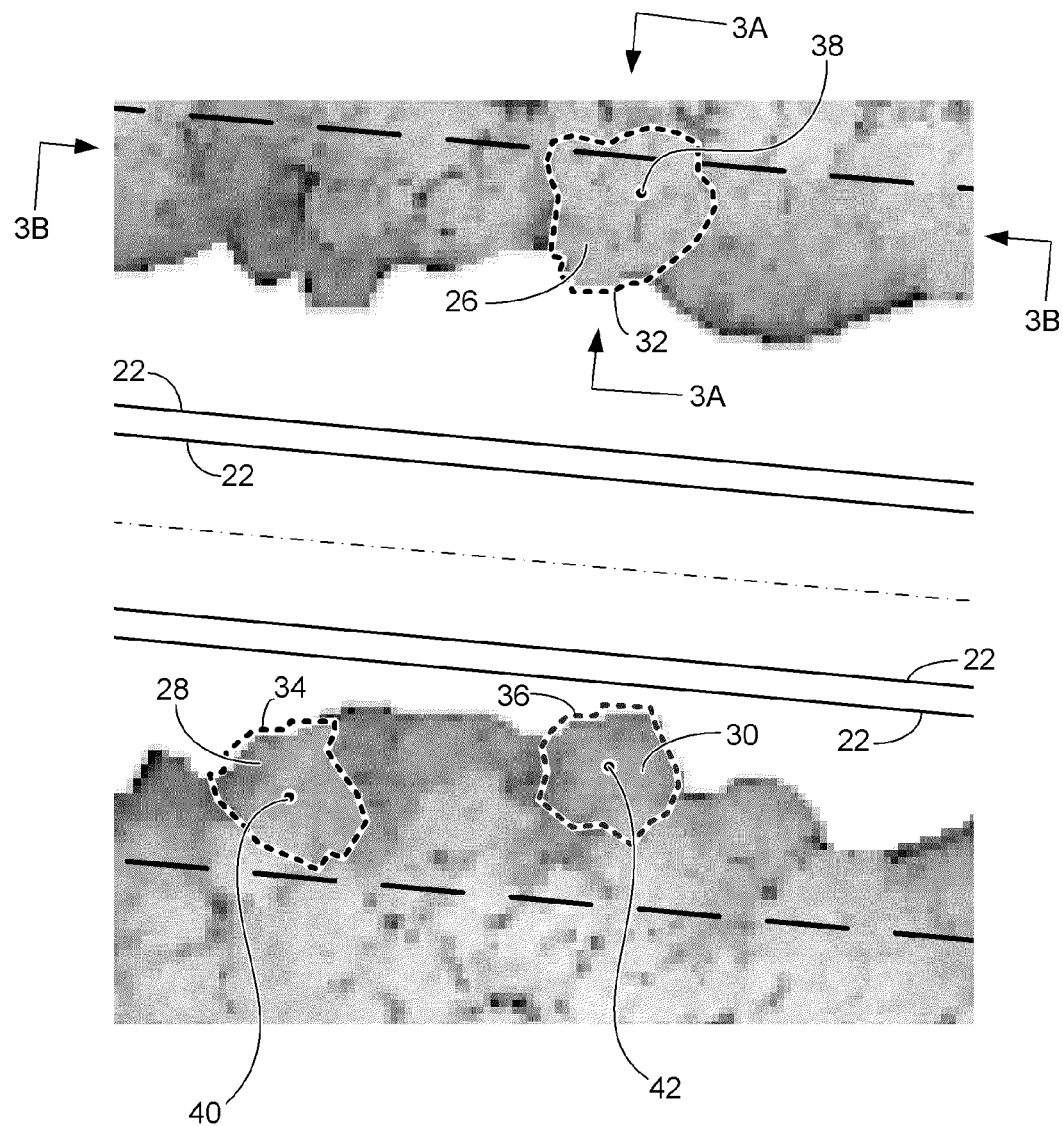
FIG. 2 schematically illustrates an embodiment of an enlarged portion of the image from FIG. 1 and showing possible target trees for use in a method and system for locating a stem of a target tree.

FIG. 2 schematically illustrates an embodiment of an enlarged portion of the image from FIG. 1, showing possible target trees 26, 28, 30 for use in a method and system for locating a stem of a target tree. In some embodiments, candidate target trees 26, 28, and 30 may be established by identifying a tree crown 32, 34, and 36, respectively. A variety of suitable methods for tree crown identification are known to those skilled in the art, and the tree crown identification may be fully automated, partially automated, or manually done through user interaction with a processor programmed for this purpose. Optionally, a highest point in each tree crown 38, 40, and 42 may be identified by examining the LiDAR height data within each tree crown 32, 34, and 36, respectively.

Figure 3A:
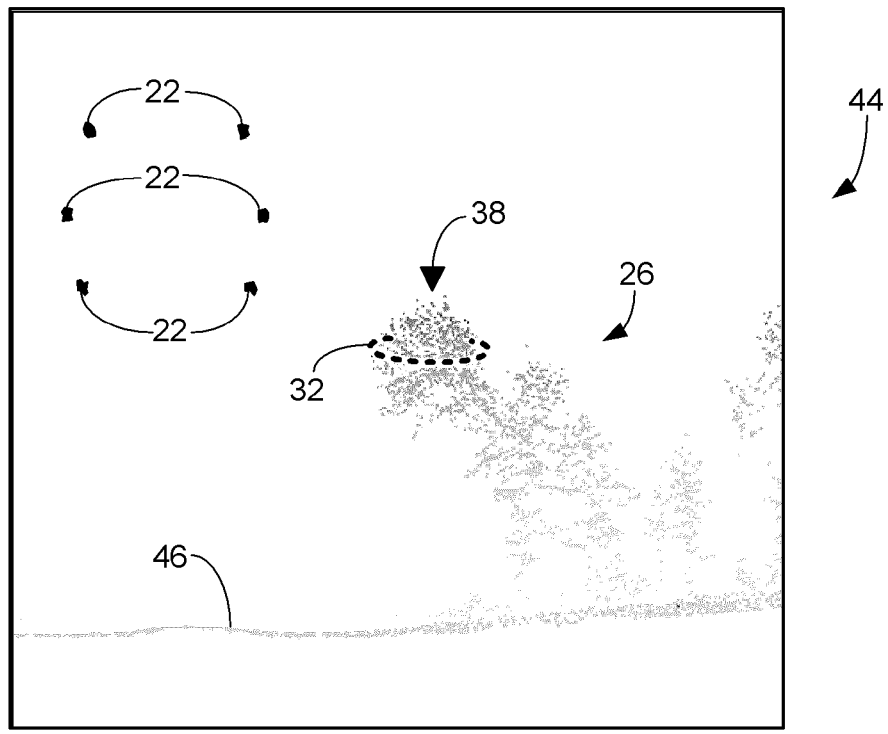
FIGS. 3A and 3B schematically illustrate embodiments of a slice from the sensing dataset, each slice including at least a portion of a target tree. Both 3A and 3B illustrate a portion of the same target tree.

A target tree may be selected for analysis, for example, target tree 26. At least one slice is then created from the sensing dataset 20, the at least one slice including at least a portion of the target tree 26. A slice may be a true cross-section of infinite depth or a slice may be a cross-section of fixed or user-selectable depth. Although numerous possible slices may be created, two example slices are illustrated and discussed herein. The first slice is a slice taken along section line 3A-3A from FIG. 2. Therefore, in this example, the first slice happens to be substantially orthogonal to the power lines 22 shown in FIG. 2 as well as substantially vertical. The first example slice 44 of the sensing dataset is illustrated in FIG. 3A. The power lines 22 and a terrain 46 are visible within this embodiment of a slice 44. Optionally, the crown 32 and/or the highest crown point 38 may be displayed in the slice 44. Due to the placement of section line 3A-3A, this two-dimensional slice includes at least a portion of the target tree 26.

Figure 3B:
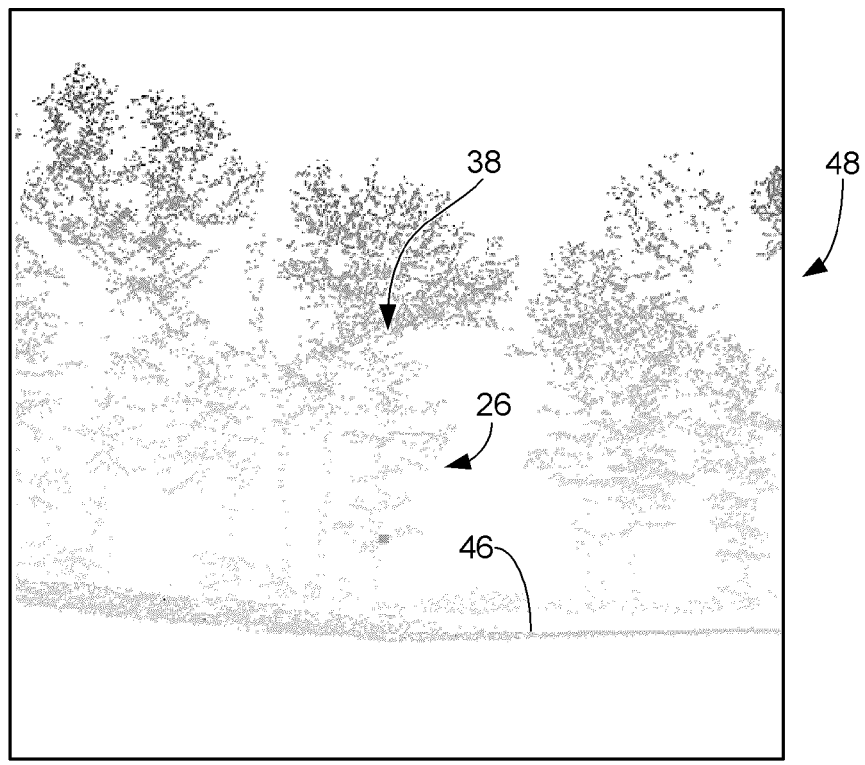

Although only a single slice is needed for the methods disclosed herein, it may sometimes be desirable to create more than one slice. As just another example, a second slice is slice taken along section line 3B-3B from FIG. 2. Therefore, in this example, the second slice happens to be substantially parallel to the power lines 22 shown in FIG. 2 as well as substantially vertical. The second example slice 48 of the sensing dataset is illustrated in FIG. 3B. Due to the positioning of section line 3B-3B, the power lines 22 are not visible in this cross-section slice. However, the terrain 46 is visible within this embodiment of a slice 48. Optionally, the crown 32 (not shown in this view) and/or the highest crown point 38 may be displayed in the slice 48. Due to the placement of section line 3B-3B, this slice includes at least a portion of the target tree 26. Although slices have been illustrated which are substantially orthogonal or parallel to a particular structure, it may also be helpful to create slices of other orientations since tree stems may grow in any direction. One or more substantially vertical slices of other orientations may be used in addition to or in lieu of the parallel and orthogonal slices illustrated and described above.

Figure 4A:
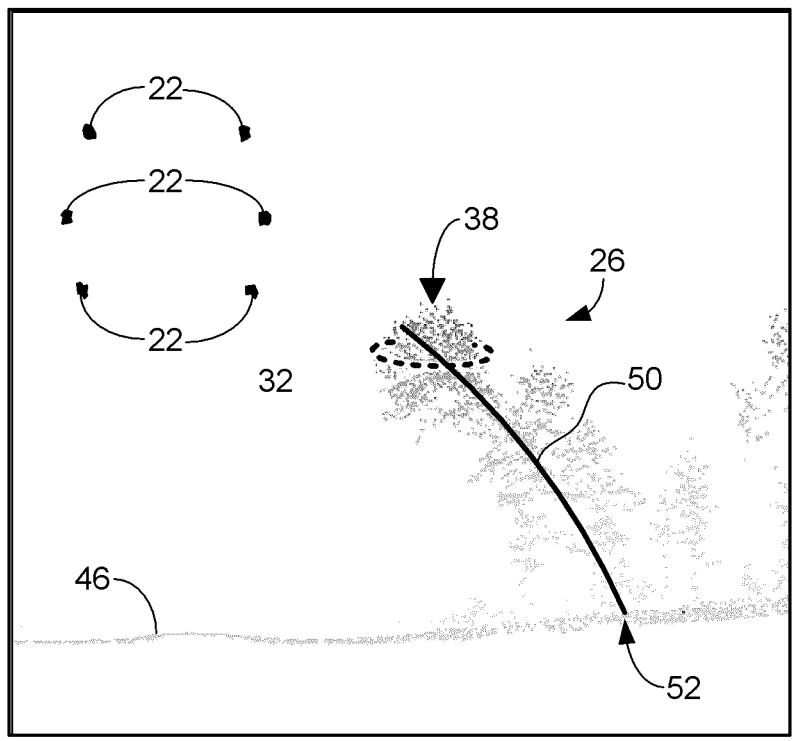
FIG. 4A schematically illustrates one embodiment of a tree stem location determination from a slice of the sensing dataset.

FIG. 4A schematically illustrates one embodiment of a tree stem location determination from a slice of the sensing dataset. A stem location curve 50 may be fitted to the included portion of the target tree 26 based on the tree data in the slice. In this embodiment, the fitted stem location curve 50 extends to the terrain 46. A stem origin 52 may be defined where the stem location curve 50 intersects or otherwise meets the terrain 46. In other embodiments, the fitted stem location curve may not extend all the way to the terrain. The stem location curve 50 may be fitted automatically, semi-automatically, or manually by a user with a processor executing instructions for the purpose.

One non-limiting embodiment for fitting the stem location curve may use a two-dimensional (2D) curve-fitting algorithm on the point cloud in the cross-section plane. The center plane of the cross-section can be used as the third axle coordinate. The cross-sections can be cut rotating around the axle between the crown center point and the ground directly under, to find a plane that best brings up the stem points. For example sum of least squares—method can be used to fit the curve in the 2D point data. When the best the fit is found, other alternative cross-sections can be iterated, until best total fit is found. The sum of least squares method can be weighed to appreciate the near-to curve-points more than points far from curve. Similarly, points near the ground, where the stem signal is most important, can be weighed more than points high in canopy. The weighting yields better fit to linear features. Other suitable curve-fitting methodologies will be apparent to those skilled in the art. Other embodiments may skip the determination of the stem location curve and use the slice data to determine the stem origin 52 without displaying the stem location curve 50.

Figure 4B:
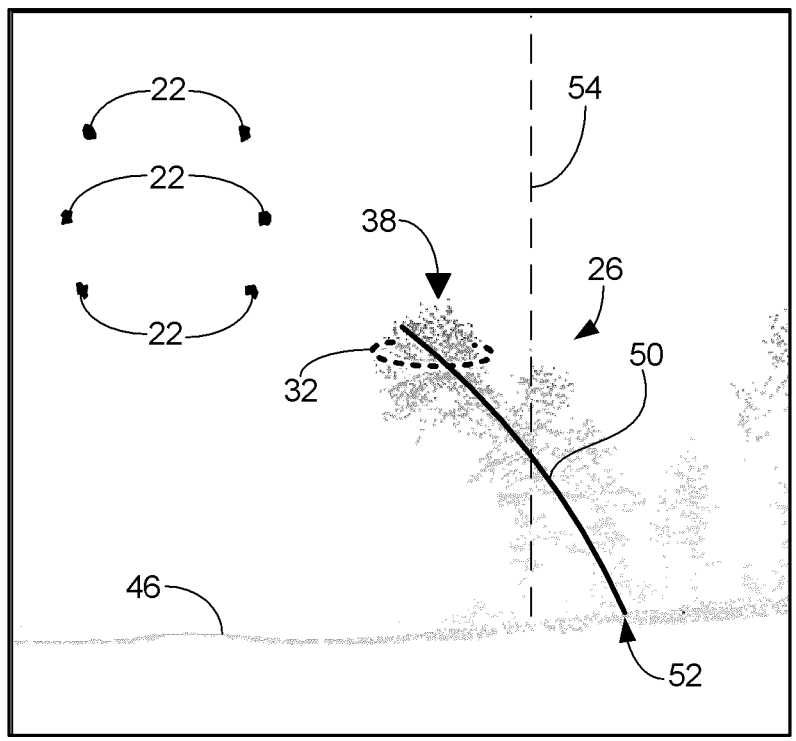
FIG. 4B schematically illustrates the embodiment of a tree stem location determination from FIG. 4A with an example of a right-of-way (ROW) boundary line in the display.

FIG. 4B schematically illustrates the embodiment of a tree stem location determination from FIG. 4A with an example of a right-of-way (ROW) boundary line 54 in the display. Accurate stem location, in particular accurate determination of stem origin 52, is highly useful for determining who has ownership rights for a particular tree and which portions of the tree may be maintained when they encroach on a ROW. Accuracy relative to ROW is helpful to vegetation maintenance planners and workers. In the example of FIG. 4B, it can be seen that the prior art method of determining stem origin by projecting a vertical line down from the highest crown point 38 would incorrectly estimate that the target tree 26 is located on the side of the ROW boundary 54 where the power lines 22 are located. Instead, the method described herein is much more accurate and can remotely determine that the target tree 26 has a stem origin outside of the ROW.

Figure 5:
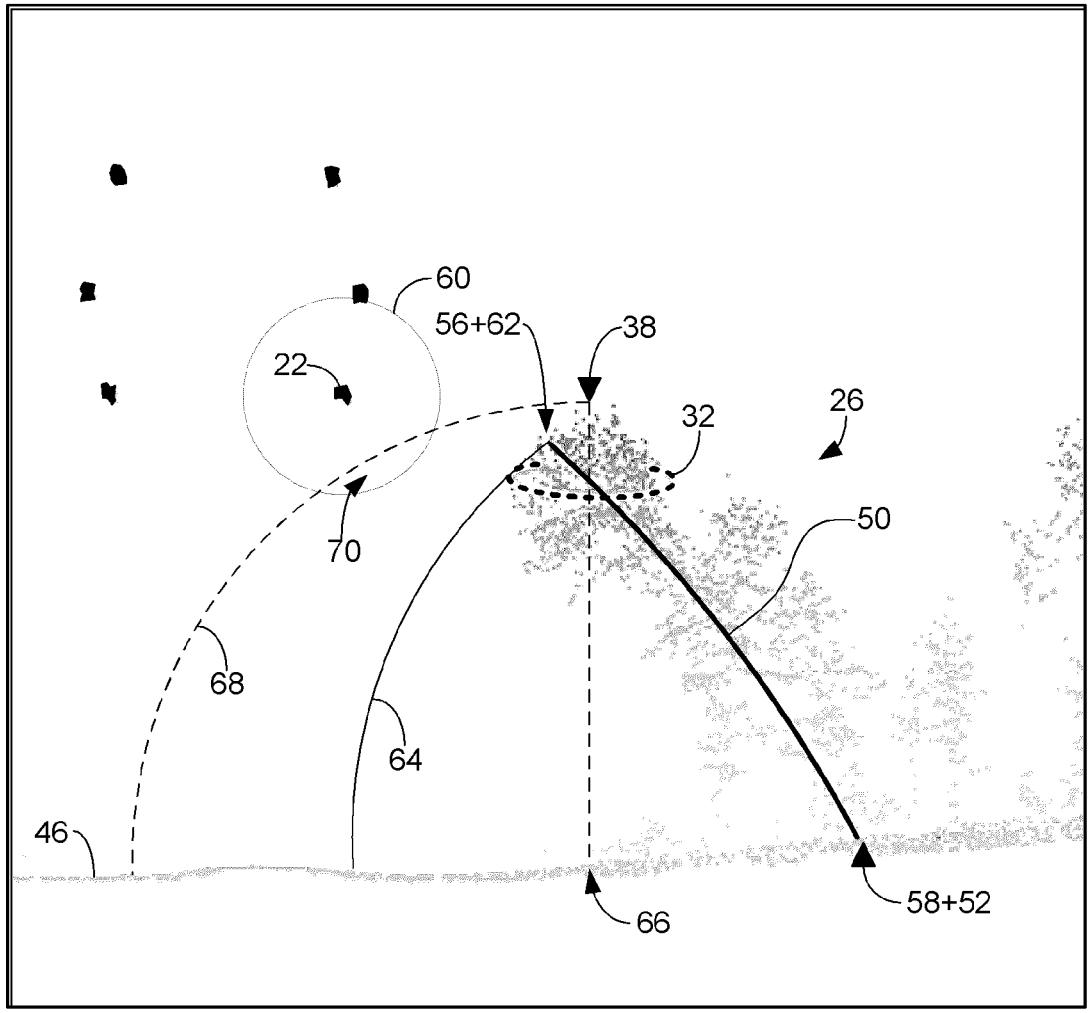
FIG. 5 schematically illustrates an embodiment of rotating a tree point of interest around a bearing point which is located at the stem origin to determine if the tree point of interest is liable to intersect with a safety buffer zone.

The methods described herein and their embodiments may also be used for more accurate falling path analysis than is currently available in the prior art. For example, FIG. 5 schematically illustrates an embodiment of rotating a tree point of interest 56 around a bearing point 58 (which in this embodiment is located at the stem origin 52) to determine if the tree point of interest 56 is liable to intersect with a safety buffer zone 60. The tree point of interest 56 may be automatically or manually selected as any part of the tree stem location curve 50, the end of the stem location curve 62 opposite the terrain 46, any portion of the target tree 26, or any user-selected point in the LiDAR dataset. In some embodiments, multiple or all of the high vegetation points inside the extruded 2D tree crown polygon 32 could be selected and linked to the bearing point. Then, the point with longest distance to the bearing point could be used as the point of interest 56. In this example, the point of interest 56 has been selected to be the point inside the projected 2D crown polygon that reaches longest from the selected pivot point. The safety buffer zone 60 may be automatically or manually defined around any object of interest in the slice. In this example, the safety buffer zone 60 is a power line safety buffer zone 60 for one of the power lines 22. In other embodiments, the safety buffer zone may be a combination of multiple safety buffer zones. For simplicity of explanation, however, only one safety buffer zone 60 is discussed here. Falling path 64 shows how the at least one tree point of interest 56 would move when rotated about the bearing point 58. Since the bearing point 58 is related to the stem location curve 50 (in this case because the stem location curve 50 was used to determine the stem origin 52), the falling path 64 is an accurate method. Note that, depending on the pivot point selected, different tree points may appear as the most far-reaching ones from the selected pivot point.

For comparison, if a method were to conduct falling path analysis using a bearing point based on the highest crown point 38, the results would not be as accurate. In the comparison, a non-ideal bearing point 66 would be located via a vertical projection down to the terrain 46 from the highest crown point 38. A non-ideal falling path 68 would be created by rotating the highest crown point 38 around the non-ideal bearing point 66. In this example of non-ideal falling path analysis (based on non-ideal bearing point 66), the non-ideal falling path 68 would falsely predict an intersection 70 with the safety buffer zone 60. By contrast, the disclosed method which rotates the point of interest 62 around a bearing point 58 related to the stem location curve 50 can provide much more accurate results, and in this example, the falling path 64 correctly predicts that the target tree 26 is not liable to intersect with the safety buffer zone 60.

Figure 6:
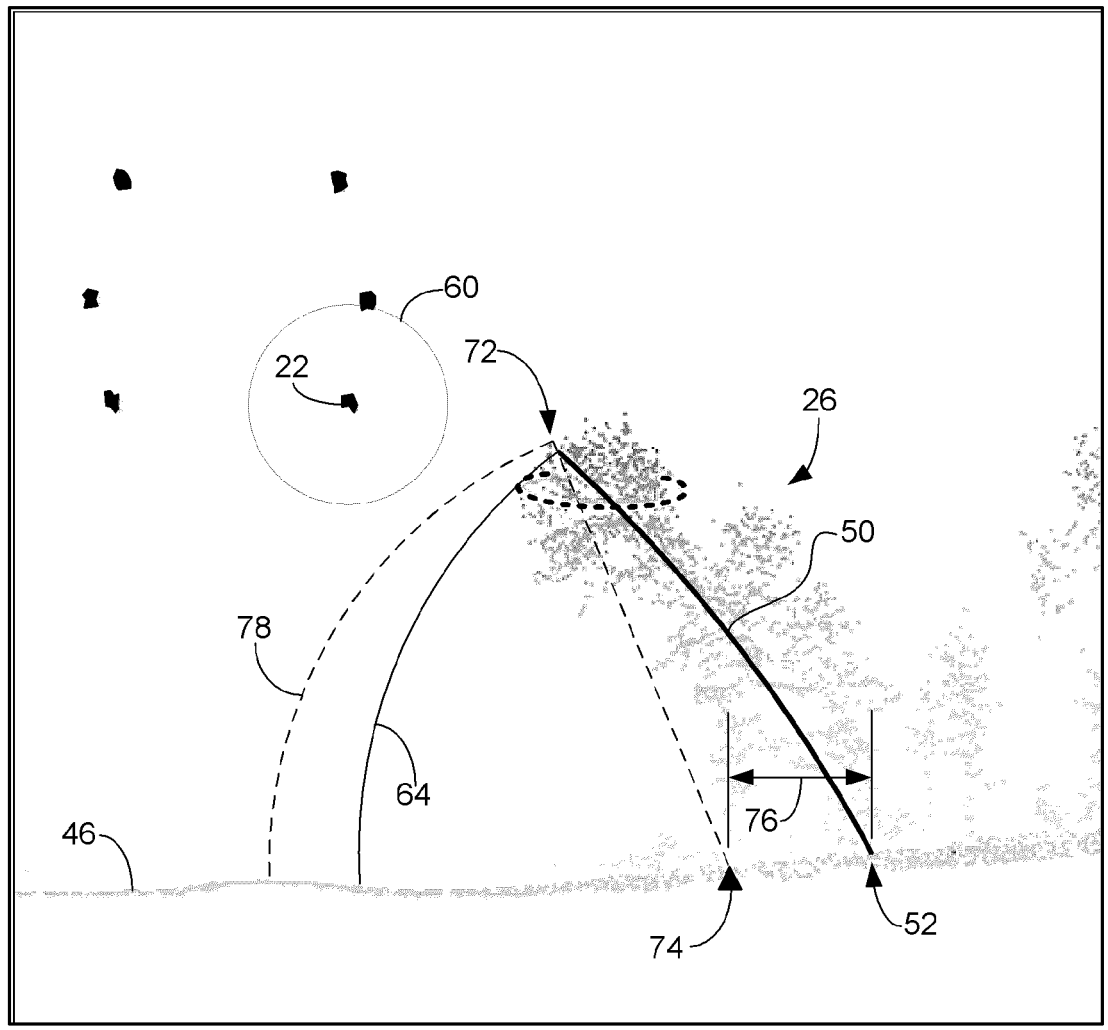
FIG. 6 schematically illustrates an embodiment of rotating a tree point of interest around a bearing point which is located a root offset distance from the stem origin to determine if the tree point of interest is liable to intersect with a safety buffer zone.
Figure 7:
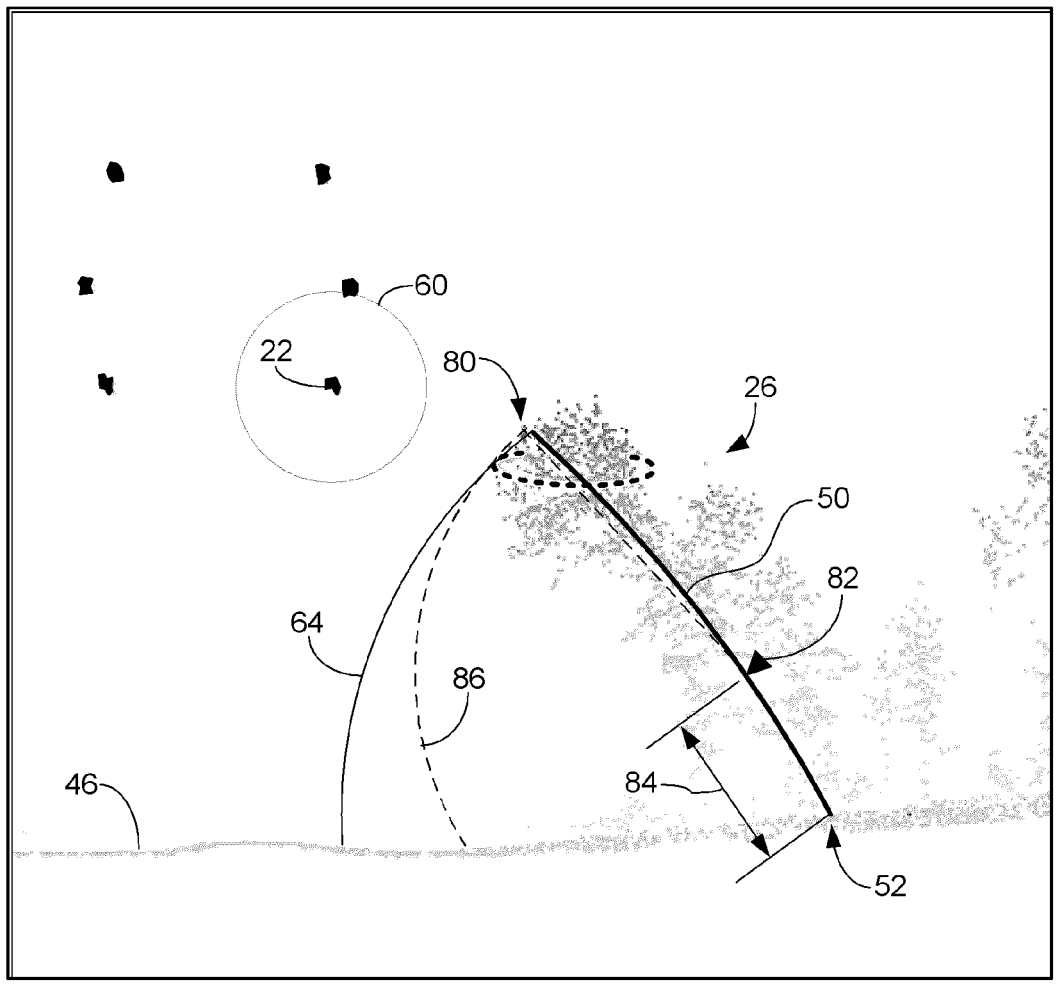
FIG. 7 schematically illustrates an embodiment of rotating a tree point of interest around a bearing point which is located a distance along the stem location curve from the stem origin to determine if the tree point of interest is liable to intersect with a safety buffer zone.

As pointed out above, the embodiment of FIG. 5 uses the stem origin 52 as the bearing point 58 related to the stem location curve 50. Different embodiments, however, may use other bearing points related to the stem location curve. FIGS. 6 and 7 illustrate non-limiting alternate examples of bearing points which are related to the stem location curve. FIG. 6 schematically illustrates an embodiment of rotating a tree point of interest 72 around a bearing point 74 which is located a root offset distance 76 from the stem origin 52 to determine if the tree point of interest 72 is liable to intersect with the safety buffer zone 60. The root offset distance 76 may be manually entered or automatically determined (for example, based on one or more of the height of the target tree 26 or a classification of the target tree 26). The root offset distance 76 may be used to take into account a scenario where a tree upends some or all of its roots when falling over. In such a case, the bearing point 74 would not be located at the stem origin 52. Instead, the bearing point 74 would be offset 76 from the stem origin 52. The resultant falling path 78, which takes into account the root offset distance 76, may be more desirable in some embodiments, and FIG. 6 illustrates the difference in falling path 78 versus the falling path 64 of FIG. 5.

FIG. 7 schematically illustrates an embodiment of rotating a tree point of interest 80 around a bearing point 82 which is located a distance 84 along the stem location curve 50 from the stem origin 52 to determine if the tree point of interest 80 is liable to intersect with a safety buffer zone 60. The distance 84 may be manually entered or automatically determined (for example, based on one or more of the height of the target tree 26 or a classification of the target tree 26). The distance 84 may be used to take into account a scenario where a tree tends to break above the ground. In such a case, the bearing point 82 would not be located at the stem origin 52. Instead, the bearing point 82 would be offset 84 along the stem location curve 50 from the stem origin 52. In other embodiments, the bearing point position on the stem location curve may be determined at a designated height from the terrain 46. In the embodiment of FIG. 7, the resultant falling path 86, which takes into account the offset distance 84, may be more desirable in some embodiments, and FIG. 7 illustrates the difference in falling path 86 versus the falling path 64 of FIG. 5.

Figure 8A:
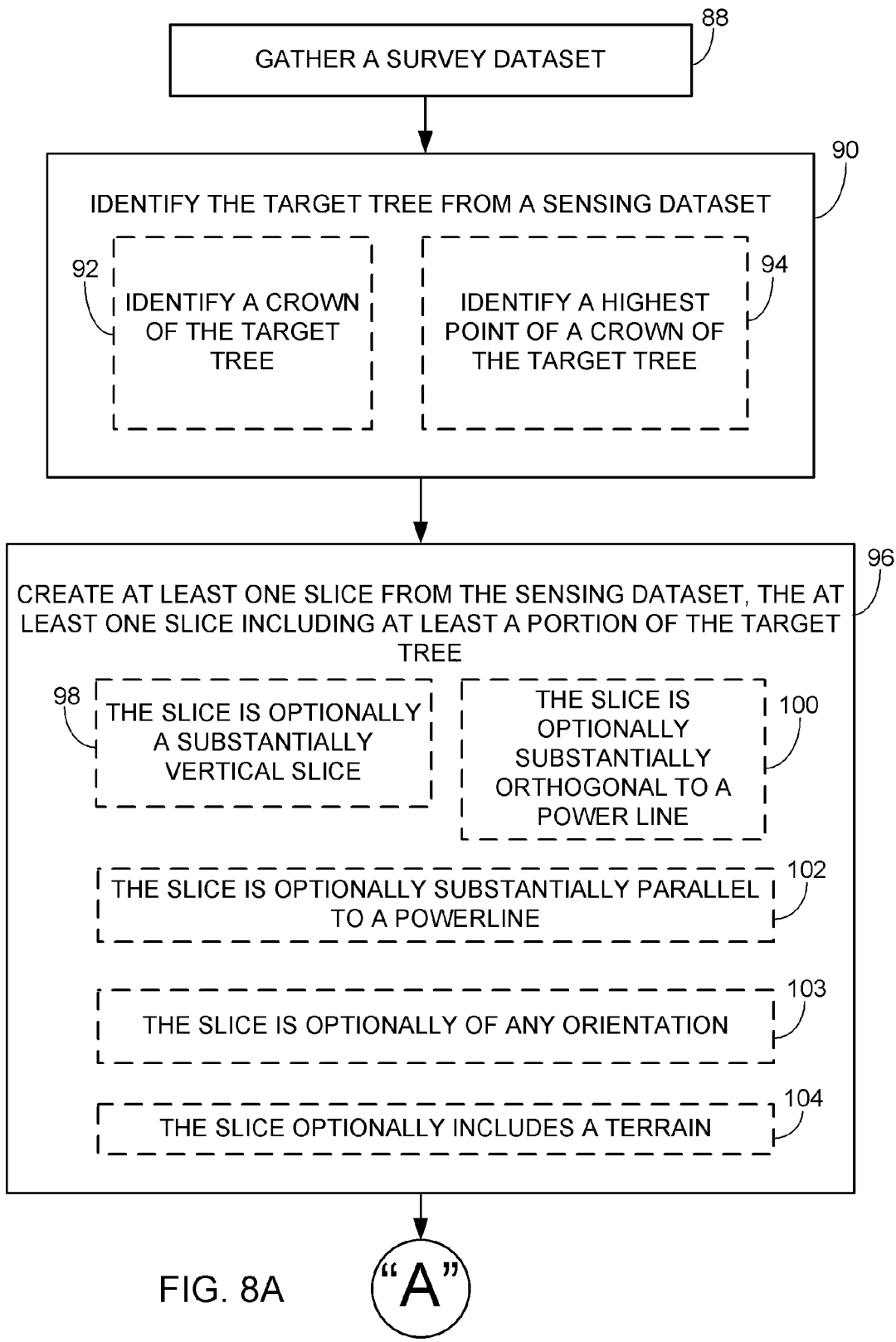
FIGS. 8A-8C illustrate one embodiment of a method for locating a stem of a target tree.
Figure 8B:
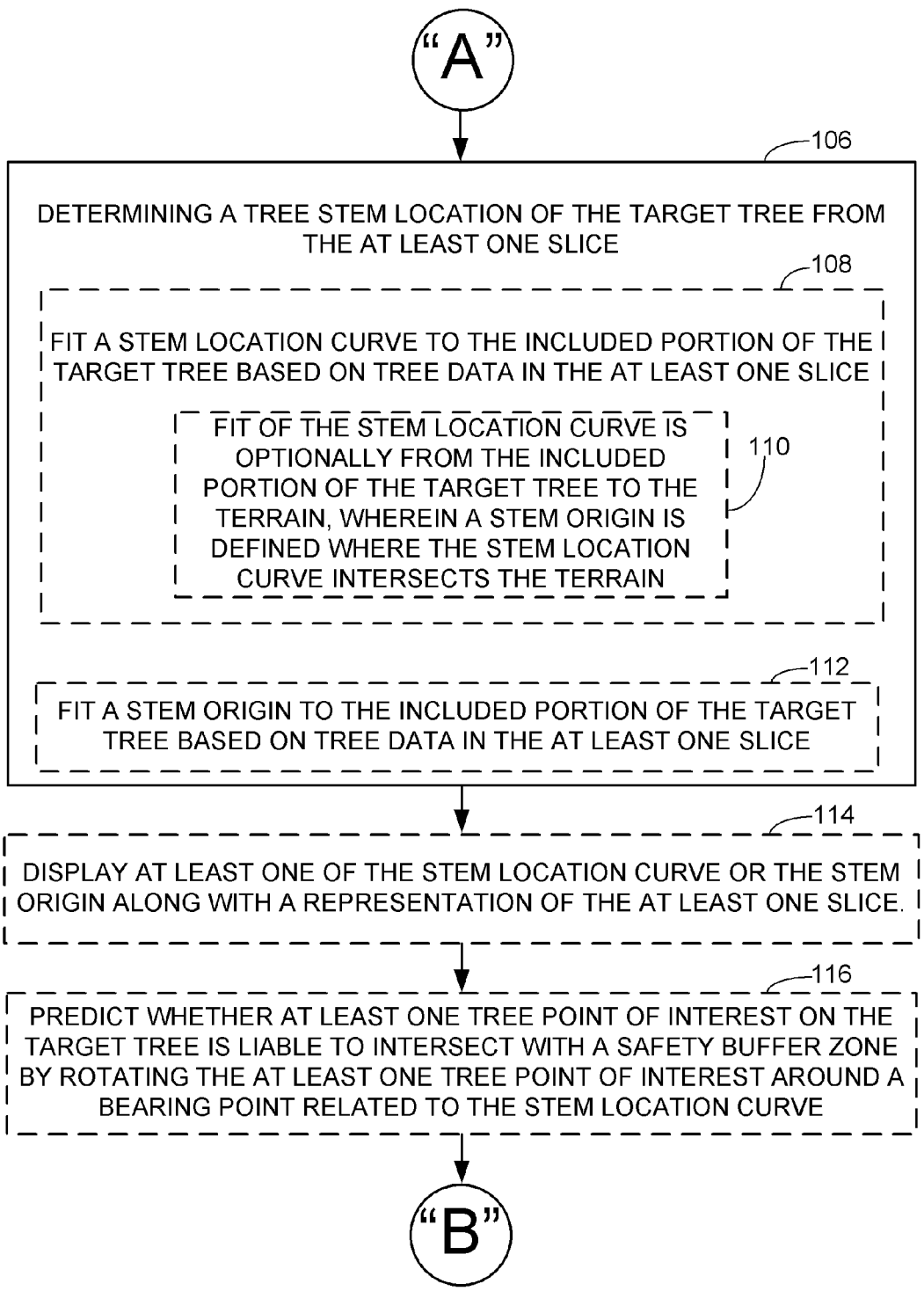
Figure 8C:
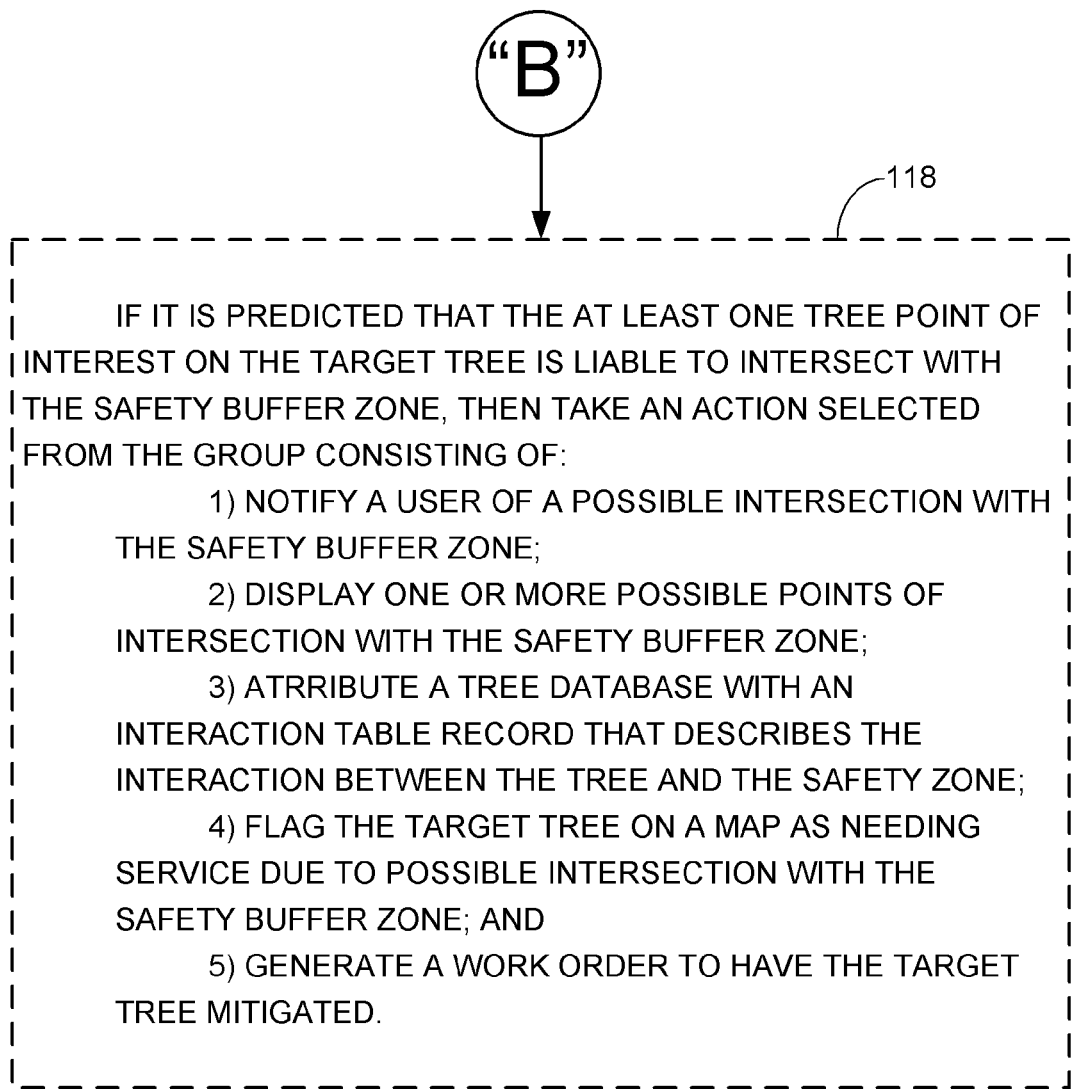

FIGS. 8A-8C illustrate one embodiment of a method for locating a stem of a target tree. Optionally, a sensing dataset is gathered 88. As mentioned earlier, the sensing dataset is preferably a three-dimensional dataset which may be collected aerially and/or from the ground. Suitable non-limiting examples of a sensing dataset include light detection and ranging (LiDAR) data, (sometimes called "laser scanning data"), radar data, synthetic aperture radar data, data from any sensor based on scanning distance-measurement and providing 3D point clouds, digital imagery, or hyperspectral imagery. In some embodiments, the sensing dataset may already be available, for example, if it is stored somewhere, and will not have to be gathered. The sensing dataset may be supported by other datasets like still imagery, color-infrared imagery, thermal imagery or hyper-spectral imagery. Such supporting datasets could be used, for example, to color the sensing data in true-to-life colors or perhaps in colors which map to some other sensed property such as heat signature, chemical composition, material composition, etc. Additionally, the optional supporting datasets could alternatively be projected on top of 3D point returns to reflect the actual color values of the 3D data points. This may allow easier identification of the stems. In some embodiments, the optional supporting datasets could be ground-based data which provide the slice data correlated to the target tree from the sensing dataset.

A target tree is identified 90 from the sensing dataset. In some embodiments, the target tree may be identified 90 by identifying 92 a crown of the target tree. In other embodiments, the target tree may be identified 90 by identifying 94 a highest point of a crown of the target tree.

At least one slice is created 96 from the sensing dataset. The at least one slice includes at least a portion of the target tree. In some embodiments, the at least one slice is a substantially vertical slice 98. In some embodiments, the at least one slice is substantially orthogonal 100 to a utility component, such as a power line. In other embodiments, the at least one slice is substantially parallel 102 to the utility component, such as a power line. In other embodiments, the at least one slice may be of any orientation 103 as discussed above. The slice may further optionally include 104 terrain points or terrain surface.

Continuing the method in FIG. 8B, a tree stem location of the target tree is determined 106 from the at least one slice. Suitable examples of a tree stem location include a stem location curve and a stem origin. As part of the determination of the tree stem location, a stem location curve may optionally be fit 108 to the included portion of the target tree based on tree data in the at least one slice. If a stem location curve has been fit which extends to the terrain, then optionally, a stem origin may be defined 110 where the stem location curve intersects the terrain. In some embodiments, a stem origin may be determined as a tree stem location even if a stem location curve is not fitted. Optionally in some embodiments, a stem origin may be fit 112 to the included portion of the target tree based on tree data in the at least one slice.

Depending on the embodiment, some optional actions may be included with the methods described above. Optionally, at least one of the stem location curve or the stem origin may be displayed 114 along with a representation of the at least one slice. In some embodiments, a prediction 116 may optionally be made on whether at least one tree point of interest on the target tree is liable to intersect with a safety buffer zone by rotating the at least one tree point of interest around a bearing point related to the stem location curve. As discussed above, the at least one tree point of interest may be a part of the stem location curve, an end of the stem location curve opposite the terrain, the included portion of the target tree, or a user-selected point in the at least one slice. As also discussed above, the bearing point may be the stem origin, a root offset from the stem origin, a distance along the stem location curve from the stem origin, or a position on the stem location curve at a designated height from the terrain.

Continuing the method in FIG. 8C, if it is predicted 118 that the at least one tree point of interest on the target tree is liable to intersect with the safety buffer zone, then an action may be taken, such as:

- Notifying a user to a possible intersection with the safety buffer zone.
- Displaying one or more possible points of intersection with the safety buffer zone.
- Attributing a tree database with an interaction table record that describes the interaction between the tree and the safety zone.
- Flagging the target tree on a map as needing service due to the possible intersection with the safety buffer zone.
- Generating a work order to have the target tree mitigated. (As used herein, mitigation can refer to total tree or vegetation removal, mowing (the removal of small vegetation), pruning, the removal of whole branches, trimming, cutting of branches to a desired shape, chemical treatment (for example, using a herbicide to kill the vegetation, thus stopping its further growth), or debarking (which can lead to the death of a tree in the long-run)).

Figure 9:
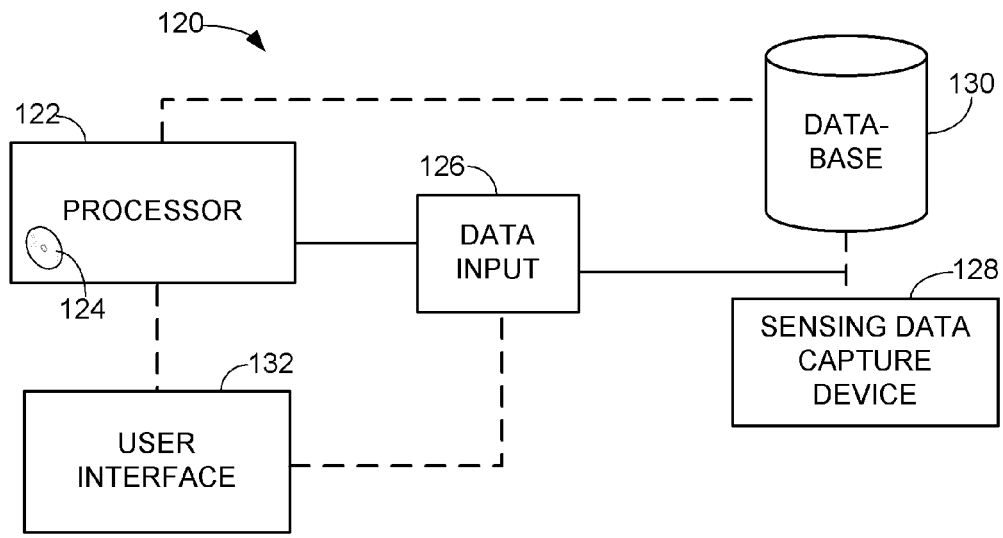
FIGS. 9 and 10 schematically illustrate different embodiments of a system for locating a stem of a target tree.

FIG. 9 schematically illustrates an embodiment of a system 120 for locating a stem of a target tree. The system 120 has a processor 122 which is configured to 1) identify the target tree from a sensing dataset; 2) create at least one slice from the sensing dataset, the at least one slice including at least a portion of the target tree; and 3) determine a tree stem location of the target tree from the at least one slice. Embodiments of suitable processes and method steps to locate the stem of the target tree have already been discussed above. The processor 122 may be a computer executing machine readable instructions which are stored on a computer readable storage medium 124, such as, but not limited to a CD, a magnetic tape, an optical drive, a DVD, a hard drive, a flash drive, a memory card, a memory chip, or any other computer readable storage medium. The processor 122 may alternatively or additionally include a laptop or desktop computer, a microprocessor, an application-specific integrated circuit (ASIC), digital components, analog components, or any combination and/or plurality thereof. The processor 122 may be a stand-alone unit, or it may be a distributed set of devices.

A data input 126 is coupled to the processor 122 and configured to provide the processor 122 with at least one sensing dataset. A sensing data capture device 128 may optionally be coupled to the data input 126 to enable the live capture of a sensing dataset. Examples of sensing data capture devices include, but are not limited to, full-waveform, multiple-return or first and last pulse-recording LiDAR sensors. Similarly, a database 130 may optionally be coupled to the data input 126 to provide one or more previously captured sensing datasets to the processor 122. Database 130 can be as simple as a memory device holding raw data or formatted files, or database 130 can be a complex relational database. Depending on the embodiment, none, one, or multiple databases 130 and/or sensing data capture devices 128 may be coupled to the data input 126. The sensing data capture device 128 may be coupled to the data input 126 by a wired connection, an optical connection, or by a wireless connection. Suitable examples of wireless connections may include, but are not limited to, RF connections using an 802.11x protocol or the Bluetooth® protocol. Furthermore, in embodiments having a database 130, the processor 122 may be coupled to the database 130 for storing results or accessing data by bypassing the data input 126.

The system 120 also has a user interface 132 which may be coupled to either the processor 122 and/or the data input 126. The user interface 132 can be configured to display a sensing dataset, at least one slice from the sensing dataset, a tree stem location (including a stem location curve and/or a stem origin), and/or any of the other features discussed above. The user interface 132 may also be configured to allow a user to select a sensing dataset from a database 130 coupled to the data input 126, or to start and stop collecting data from a sensing data capture device 128 which is coupled to the data input 126.

Figure 10:
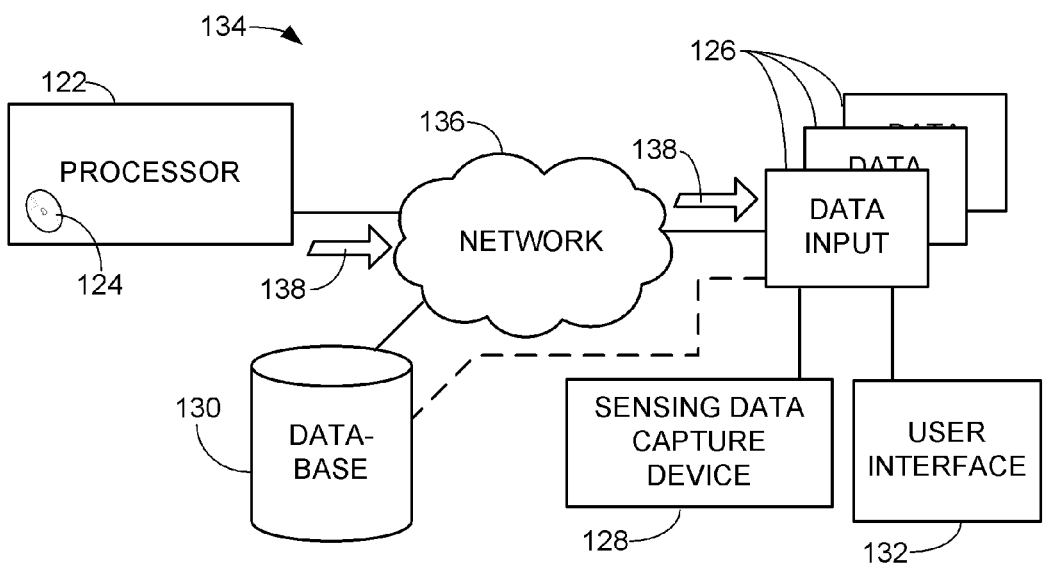

FIG. 10 schematically illustrates another embodiment of a system 134 for locating a stem of a target tree. In this embodiment, the processor 122 is set-up to be a remote processor which is coupled to the data input 126 over a network 136. The network 136 may be a wired or wireless local area network (LAN or WLAN) or the network 136 may be a wired or wireless wide area network (WAN, WWAN) using any number of communications protocols to pass data back and forth. Having a system 134 where the processor 122 is located remotely allows multiple client side data inputs 126 to share the resources of the processor 122. One or more sensing datasets may be obtained by the data input 126 from a database 130 and/or a sensing data capture device 128 under the control of a user interface 132 coupled to the data input 126. The one or more sensing datasets may then be transferred over the network 136 to the processor 122 which can then 1) identify the target tree from a sensing dataset; 2) create at least one slice from the sensing dataset, the at least one slice including at least a portion of the target tree; and 3) determine a tree stem location of the target tree from the at least one slice; and 4) transmit data signals 138 having the determined tree stem location to the client side. Such data transmissions may take place over a variety of transmission media, such as wired cable, optical cable, and air. In this embodiment, the remote processor 122 can be used to help keep the cost of the client-side hardware down, and can facilitate any upgrades to the processor or the instructions being carried out by the processor, since there is a central upgrade point.

Figure 11:
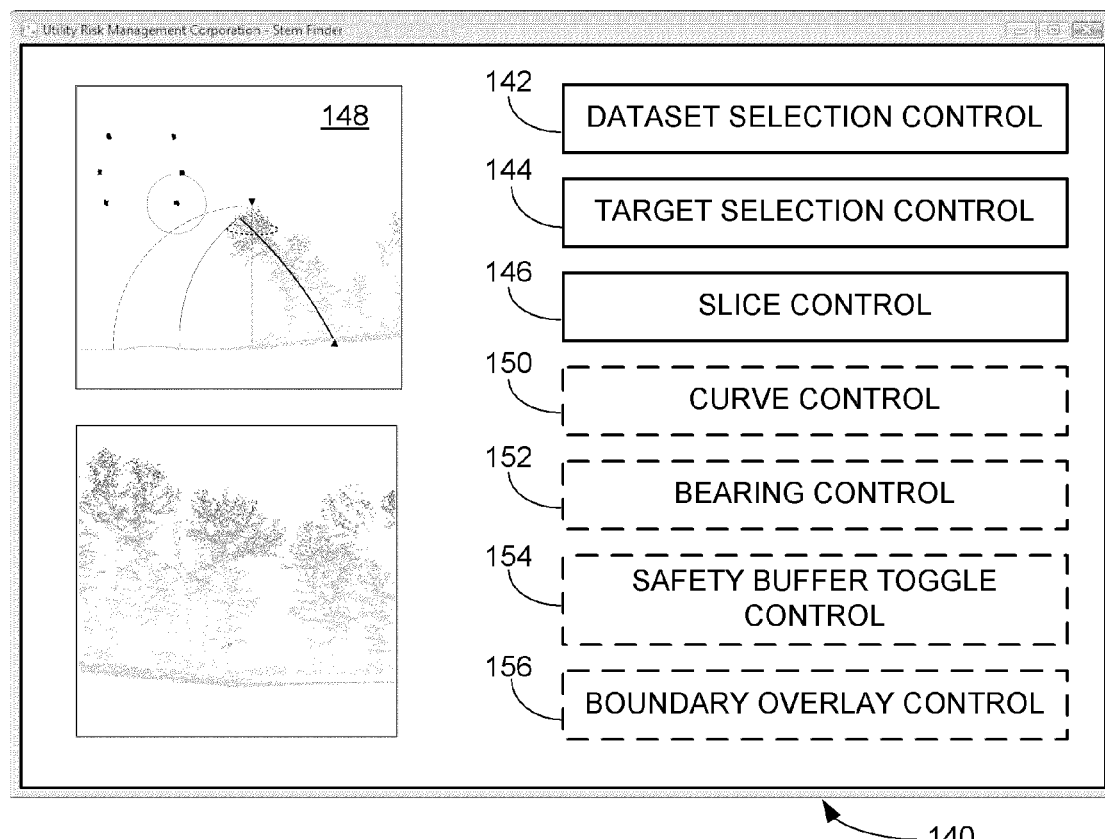
FIG. 11 schematically illustrates one embodiment of a graphical user interface (GUI) for locating a stem of a target tree.

FIG. 11 schematically illustrates one embodiment of a graphical user interface (GUI) 140 for use in locating a stem of a target tree on an electronic device. Suitable non-limiting examples of an electronic device include a computer, a laptop, a notebook, and a personal digital assistant (PDA). The GUI 140 has a dataset selection control 142 configured to provide a sensing dataset. The GUI 140 also has a target selection control 144 configured to identify the target tree from the sensing dataset. Some embodiments of the target selection control 144 may control or open a further GUI similar to the views illustrated in FIGS. 1 and 2. The target selection control 144 may be further configured to identify a crown of the target tree in some embodiments. Referring to FIG. 11, the GUI 140 also has a slice control 146 configured to create at least one slice from the sensing dataset, the at least one slice including at least a portion of the target tree. The GUI 140 further has a stem location display 148 configured to display a tree stem location of the target tree which is determined from the at least one slice. In some embodiments, the stem location display 148 may further be configured to display a terrain from the at least one slice. The GUI 140 may optionally have a curve control 150 configured to fit a stem location curve to tree data from the at least one slice. In embodiments of the GUI where the stem location display 148 is further configured to display a terrain from the at least one slice, the curve control 150 may further be configured to fit the stem location curve such that it intersects the terrain. The GUI 140 may optionally have a bearing control 152 configured to select a bearing point relative to the stem location curve. In some embodiments, the bearing points are attributed to the original tree polygon records, and all vegetation returns from the sensing data inside the given polygon are linked to this bearing point. This allows mass-processing of the falling path analysis without additional user input on tree level. In some embodiments, the stem location display 148 may further be configured to display a safety buffer zone such that it can be determined from looking at the stem location display 148 whether or not at least one tree point of interest on the target tree is liable to intersect with the safety buffer zone if the at least one tree point of interest is rotated around the bearing point. The GUI 140 may optionally be provided with a safety buffer toggle control 154 configured to show or hide the safety buffer zone in the stem location display 148. The GUI 140 may also optionally be provided with a boundary overlay control 156 which may be configured to show or hide a ROW boundary in the stem location display 148. Alternate GUI embodiments may be configured to have a batch processing interface to run the falling path analysis over a large number of trees when triggered by a single command.

Having thus described several embodiments of a method and system for locating a stem of a target tree, it will be rather apparent to those skilled in the art that the foregoing detailed disclosure is intended to be presented by way of example only, and is not limiting. Although the claimed invention has been described in terms of a ROW for utility transport (for example the transportation of, electricity, water, gas, oil), the claimed invention is also equally applicable to a safety buffer zone around other types of ROW's, including those for railway tracks, railway overhead wires, overhead phone lines, and communication cables. Various alterations, improvements, and modifications will occur and are intended to those skilled in the art, though not expressly stated herein. These alterations, improvements, and modifications are intended to be suggested hereby, and are within the spirit and the scope of the claimed invention. Additionally, the recited order of the processing elements or sequences, or the use of numbers, letters, or other designations therefore, is not intended to limit the claimed processes to any order except as may be specified in the claims. Accordingly, the claimed invention is limited only by the following claims and equivalents thereto.

What is claimed is:

1. A method for locating a stem of a target tree, comprising:
   identifying the target tree from a sensing dataset;
   creating at least one slice from the sensing dataset, the at least one slice including at least a portion of the target tree; and
   determining a tree stem location of the target tree from the at least one slice.

2. The method of claim 1, wherein the sensing dataset comprises a three-dimensional dataset.

3. The method of claim 1, wherein the sensing dataset comprises data selected from the group consisting of light detection and ranging (LiDAR) data, laser scanning data, radar data, synthetic aperture radar data, data from any sensor based on scanning distance-measurement and providing point clouds, digital imagery, video, or hyperspectral imaging data.

4. The method of claim 1, further comprising gathering the sensing dataset.

5. The method of claim 4, wherein gathering the sensing dataset further comprises aerially gathering the sensing dataset.

6. The method of claim 1, wherein identifying the target tree from the sensing dataset comprises identifying a crown of the target tree from the sensing dataset.

7. The method of claim 1, wherein identifying the target tree from the sensing dataset comprises identifying a highest point of a crown of the target tree from the sensing dataset.

8. The method of claim 1, wherein the at least one slice created from the sensing dataset comprises a two-dimensional slice.

9. The method of claim 1, wherein the at least one slice created from the sensing dataset comprises a cross-sectional slice.

10. The method of claim 1, wherein the at least one slice comprises a substantially vertical slice.

11. The method of claim 1, wherein the sensing dataset is supported by a supporting dataset.

12. The method of claim 1, wherein determining the tree stem location of the target tree from the at least one slice further comprises fitting a stem location curve to the included portion of the target tree based on tree data in the at least one slice.

13. The method of claim 12, wherein:
   the at least one slice further includes a terrain;
   fitting the stem location curve to the included portion of the target tree comprises fitting the stem location curve from the included portion of the target tree to the terrain; and
   a stem origin is defined where the stem location curve intersects the terrain.

14. The method of claim 13, further comprising:
   displaying at least one of the stem location curve or the stem origin along with a representation of the at least one slice.

15. The method of claim 13, further comprising:
   predicting whether at least one tree point of interest on the target tree is liable to intersect with a safety buffer zone by rotating the at least one tree point of interest around a bearing point related to the stem location curve.

16. The method of claim 15, wherein the at least one tree point of interest is selected from a group consisting of a part of the stem location curve, an end of the stem location curve opposite the terrain, the included portion of the target tree, and a user-selected point in the at least one slice.

17. The method of claim 15, wherein the bearing point related to the stem location curve is selected from the group consisting of:
   the stem origin;
   a root offset from the stem origin;
   a distance along the stem location curve from the stem origin; and
   a position on the stem location curve at a designated height from the terrain.

18. The method of claim 15, wherein the safety buffer zone is selected from the group consisting of a power line safety buffer zone, a railroad track safety buffer zone, a railroad overhead conductor safety buffer zone, a phone line safety buffer zone, a phone line safety buffer zone, and a communication cable safety buffer zone.

19. The method of claim 15, further comprising:
if it is predicted that the at least one tree point of interest on the target tree is liable to intersect with the safety buffer zone, then taking an action selected from the group consisting of:
notifying a user of a possible intersection with the safety buffer zone;
displaying one or more possible points of intersection with the safety buffer zone;
attributing a tree database with an interaction table record that describes an interaction between the target tree and the safety buffer zone;
flagging the target tree on a map as needing service due to possible intersection with the safety buffer zone; and
generating a work order to have the target tree mitigated.

20. A computer readable storage medium, having stored thereon instructions for locating a stem of a target tree, which, when executed by a processor, cause the processor to:
provide a sensing dataset;
identify the target tree from the sensing dataset;
create at least one slice from the sensing dataset, the at least one slice including at least a portion of the target tree; and
determine a tree stem location of the target tree from the at least one slice.

21. The computer readable storage medium of claim 20, wherein the instructions, which, when executed by the processor, cause the processor to determine the tree stem location of the target tree from the at least one slice further comprise instructions to fit a stem location curve to the included portion of the target tree based on tree data in the at least one slice.

22. The computer readable storage medium of claim 21, wherein:
the at least one slice further includes a terrain;
the instructions to fit the stem location curve to the included portion of the target tree comprise instructions to fit the stem location curve from the included portion of the target tree to the terrain; and
the computer readable storage medium further has instructions stored thereon for defining a stem origin where the stem location curve intersects the terrain.

23. The computer readable storage medium of claim 22, further comprising instructions stored thereon for:
displaying at least one of the stem location curve or the stem origin along with a representation of the at least one slice.

24. The computer readable storage medium of claim 22, further comprising instructions stored thereon for:
predicting whether at least one tree point of interest on the target tree is liable to intersect with a safety buffer zone by rotating the at least one tree point of interest around a bearing point related to the stem location curve.

25. The computer readable storage medium of claim 24, wherein the at least one tree point of interest is selected from a group consisting of a part of the stem location curve, an end of the stem location curve opposite the terrain, the included portion of the target tree, and a user-selected point in the at least one slice.

26. The computer readable storage medium of claim 24, wherein the bearing point related to the stem location curve is selected from the group consisting of:
the stem origin;
a root offset from the stem origin;
a distance along the stem location curve from the stem origin; and
a position on the stem location curve at a designated height from the terrain.

27. The computer readable storage medium of claim 24, wherein the safety buffer zone comprises a power line safety buffer zone.

28. The computer readable storage medium of claim 24, further comprising instructions for:
if it is predicted that the at least one tree point of interest on the target tree is liable to intersect with the safety buffer zone, then taking an action selected from the group consisting of:
notifying a user of a possible intersection with the safety buffer zone;
displaying one or more possible points of intersection with the safety buffer zone;
attributing a tree database with an interaction table record that describes an interaction between the target tree and the safety buffer zone;
flagging the target tree on a map as needing service due to possible intersection with the safety buffer zone; and
generating a work order to have the target tree mitigated.

29. A graphical user interface for use on an electronic device, the graphical user interface for locating a stem of a target tree and comprising:
a dataset selection control configured to provide a sensing dataset;
a target selection control configured to identify the target tree from the sensing dataset;
a slice control configured to create at least one slice from the sensing dataset, the at least one slice including at least a portion of the target tree; and
a stem location display configured to display a tree stem location of the target tree which is determined from the at least one slice.

30. The graphical user interface of claim 29, wherein the target selection control is further configured to identify a crown of the target tree.

31. The graphical user interface of claim 29, further comprising a curve control configured to fit a stem location curve to tree data from the at least one slice.

32. The graphical user interface of claim 31, wherein:
the stem location display is further configured to display a terrain from the at least one slice; and
the curve control is further configured to fit the stem location curve such that it intersects the terrain.

33. The graphical user interface of claim 32, further comprising:
a bearing control configured to select a bearing point relative to the stem location curve.

34. The graphical user interface of claim 32, wherein the stem location display is further configured to display a safety buffer zone such that it can be determined from looking at the stem location display whether or not at least one tree point of interest on the target tree is liable to intersect with the safety buffer zone if the at least one tree point of interest is rotated around a bearing point.

35. A system for locating a stem of a target tree, comprising:
   a) a processor configured to:
      1) identify the target tree from a sensing dataset;
      2) create at least one slice from the sensing dataset, the at least one slice including at least a portion of the target tree; and
      3) determine a tree stem location of the target tree from the at least one slice;
   b) a data input coupled to the processor and configured to provide the processor with the sensing dataset; and
   c) a user interface coupled to either the processor or the data input.

36. The system of claim 35, further comprising a database coupled to the processor.

37. The system of claim 35, further comprising a database coupled to the data input.

38. The system of claim 35, further comprising a sensing data capture device coupled to the data input.

39. The system of claim 38, wherein the sensing data capture device is selected from the group consisting of a light detection and ranging (LiDAR) system, a laser scanning system, a radar system, a synthetic aperture radar system, a system using a sensor based on scanning distance-measurement and providing 3D point clouds, a digital imaging system, and a hyperspectral imaging system.

40. The system of claim 38, wherein the sensing data capture device is coupled to the data input by a wireless connection.

41. The system of claim 35, wherein the processor and the data input are coupled together via a network.

42. The system of claim 35, wherein the processor is further configured to determine the tree stem location of the target tree from the at least one slice further comprise instructions to fit a stem location curve to the included portion of the target tree based on tree data in the at least one slice.

43. The system of claim 42, wherein:
   the at least one slice further includes a terrain;
   the processor configuration to fit the stem location curve to the included portion of the target tree comprise a configuration to fit the stem location curve from the included portion of the target tree to the terrain; and
   the processor is further configured to define a stem origin where the stem location curve intersects the terrain.

44. The system of claim 43, wherein the processor is further configured to display at least one of the stem location curve or the stem origin along with a representation of the at least one slice.

45. The system of claim 43, wherein the processor is further configured to predict whether at least one tree point of interest on the target tree is liable to intersect with a safety buffer zone by rotating the at least one tree point of interest around a bearing point related to the stem location curve.

46. The system of claim 45, wherein the at least one tree point of interest is selected from a group consisting of a part of the stem location curve, an end of the stem location curve opposite the terrain, the included portion of the target tree, and a user-selected point in the at least one slice.

47. The system of claim 45, wherein the bearing point related to the stem location curve is selected from the group consisting of:
   the stem origin;
   a root offset from the stem origin;
   a distance along the stem location curve from the stem origin; and
   a position on the stem location curve at a designated height from the terrain.

48. The system of claim 45, wherein the safety buffer zone is selected from the group consisting of a power line safety buffer zone, a railroad track safety buffer zone, a railroad overhead conductor safety buffer zone, a phone line safety buffer zone, and a communication cable safety buffer zone.

49. The system of claim 45, wherein the processor is further configured to take an action selected from the group consisting of:
   notifying a user of a possible intersection with the safety buffer zone;
   displaying one or more possible points of intersection with the safety buffer zone;
   attributing a tree database with an interaction table record that describes an interaction between the target tree and the safety buffer zone;
   flagging the target tree on a map as needing service due to possible intersection with the safety buffer zone; and
   generating a work order to have the target tree mitigated;
   if it is predicted that the at least one tree point of interest on the target tree is liable to intersect with the safety buffer zone.

50. A method for locating a stem of a target tree, comprising:
   a) identifying the target tree from an aerially gathered three-dimensional sensing dataset selected from the group consisting of:
      1) light detection and ranging (LiDAR) data;
      2) laser scanning data;
      3) radar data;
      4) synthetic aperture radar data; and
      5) data from a sensor based on scanning distance-measurement and providing 3D point clouds;
   the target tree being identified by identifying at least one of a crown or a highest point of a crown of the target tree from the sensing dataset;
   b) creating at least one substantially vertical slice from the sensing dataset, the at least one slice including:
      1) at least a portion of the target tree; and
      2) a terrain;
   c) determining a tree stem location of the target tree from the at least one slice by fitting a stem location curve from the included portion of the target tree to the terrain based on tree data in the at least one slice;
   d) defining a stem origin where the stem location curve intersects the terrain;
   e) displaying at least one of the stem location curve or the stem origin along with a representation of the at least one slice;
   f) predicting whether at least one tree point of interest on the target tree is liable to intersect with a safety buffer zone by rotating the at least one tree point of interest around a bearing point related to the stem location curve, wherein:
      1) the at least one tree point of interest is selected from a group consisting of a part of the stem location curve, an end of the stem location curve opposite the terrain, the included portion of the target tree, and a user-selected point in the at least one slice;
      2) the bearing point related to the stem location curve is selected from the group consisting of the stem origin, a root offset from the stem origin, a distance along the stem location curve from the stem origin, a position on the stem location curve at a designated height from the terrain; and g) if it is predicted that the at least one tree point of interest on the target tree is liable to intersect with the safety buffer zone, then taking an action selected from the group consisting of:
1) notifying a user of a possible intersection with the safety buffer zone;
2) displaying one or more possible points of intersection with the safety buffer zone;
3) attributing a tree database with an interaction table record that describes an interaction between the target tree and the safety buffer zone;
4) flagging the target tree on a map as needing service due to possible intersection with the safety buffer zone; and
5) generating a work order to have the target tree mitigated.

* * * * *